United States Patent [19]

Kawamura

[11] Patent Number: 4,674,861
[45] Date of Patent: Jun. 23, 1987

[54] IMAGE PROCESSING APPARATUS

[75] Inventor: Naoto Kawamura, Inagi, Japan

[73] Assignee: Canon Kabushiki Kaisha, Tokyo, Japan

[21] Appl. No.: 500,071

[22] Filed: Jun. 1, 1983

[30] Foreign Application Priority Data

Jun. 3, 1982 [JP] Japan .................................. 57-94014

[51] Int. Cl.$^4$ ............................................. H04N 1/46
[52] U.S. Cl. ......................................... 355/4; 355/32; 355/40; 358/75; 358/78
[58] Field of Search ........................... 355/4, 7, 32, 40; 358/75, 78

[56] References Cited

U.S. PATENT DOCUMENTS

| | | | |
|---|---|---|---|
| 4,270,141 | 5/1981 | Sakamoto | 358/78 |
| 4,305,093 | 12/1981 | Nasu | 358/78 X |
| 4,346,401 | 8/1982 | Ohara | 358/75 |
| 4,393,399 | 7/1983 | Gast et al. | 358/78 X |
| 4,463,374 | 7/1984 | Thompson | 358/78 |
| 4,464,677 | 8/1984 | Kuhn et al. | 358/75 |
| 4,476,487 | 10/1984 | Klie et al. | 358/78 X |

FOREIGN PATENT DOCUMENTS

| | | | |
|---|---|---|---|
| 0056572 | 4/1983 | Japan | 358/75 |
| 2102240 | 1/1983 | United Kingdom | 358/75 |

*Primary Examiner*—William M. Shoop, Jr.
*Assistant Examiner*—Shik Luen Paul Ip
*Attorney, Agent, or Firm*—Fitzpatrick, Cella, Harper & Scinto

[57] ABSTRACT

An image processing apparatus has a memory for storing codes representing types of input image data and a comparator for selecting one of a number of threshold patterns in accordance with the code and comparing the input data with the selected threshold pattern to produce an image signal.

18 Claims, 17 Drawing Figures

| A | B | C | D |
|---|---|---|---|
| 14 10 6 15<br>5 1 2 11<br>9 4 3 7<br>13 8 12 16 | 8 8 8 8<br>8 8 8 8<br>8 8 8 8<br>8 8 8 8 | 16 16 16 16<br>16 16 16 16<br>16 16 16 16<br>16 16 16 16 | 0 0 0 0<br>0 0 0 0<br>0 0 0 0<br>0 0 0 0 |

FIG. 11

| A | B | C | D |
|---|---|---|---|
| 14 10 6 15<br>5 1 2 11<br>9 4 3 7<br>13 8 12 16 | 3 7 9 4<br>12 16 13 8<br>6 15 14 10<br>2 11 5 1 | 6 15 14 10<br>2 11 5 1<br>3 7 9 4<br>12 16 13 8 | 9 4 3 7<br>13 8 12 16<br>14 10 6 15<br>5 1 2 11 |
| C | M | Y | Bl |

IMAGE PROCESSING APPARATUS

BACKGROUND OF THE INVENTION

1. Field of the Invention

The present invention relates to an image processing apparatus for reproducing a high quality of image, and more particularly to an image processing apparatus capable of sharply reproducing both a half-tone image and a line image such as a character.

2. Description of the Prior Art

A dither method has been well known as a processing method for a color image having a half-tone by digitizing it. The dither method has been used in many fields because:

(1) it can save memory capacity of a memory unit necessary for the image processing,
(2) it can represent half-tones by a binary display device, and
(3) hardware implementation of a processing apparatus is easy.

However, when such a dither method is used to reproduce normal characters or lines on a display, linearity is disturbed by a dither pattern at an edge of the displayed image and the image is not clear.

When the characters or the lines are reproduced on the display, it is advisable to digitize the color image signal by a comparison with a fixed threshold.

On the other hand, when the digitization of the color image signal by the fixed threshold is applied to the display of the normal color image, a tonality of the displayed image is lost.

Accordingly, in the image processing for the color image display, it is necessary to selectively use the dither method for a color image having half-tones and use the fixed threshold method for a character and/or line image.

In the display of the color image having half-tones, black is displayed by subtractive mixing of cyan (C), magenta (M) and yellow (Y), while in the display of the characters and lines it is advisable to display them by black color only from standpoints of consumption of ink or toner and misregistration. Accordingly, it is necessary to selectively use the three-color superposition display for the color image having half-tones and the single-color display for characters and lines.

SUMMARY OF THE INVENTION

It is an object of the present invention to provide an image processing apparatus capable of reproducing a high quality of image.

It is another object of the present invention to provide an image processing apparatus capable of sharply recording or displaying an image with a simple construction.

It is other object of the present invention to provide an image processing apparatus which can selectively use the digitization of a color image signal or select a mode of display in accordance with a content of a color image.

DETAILED DESCRIPTION OF THE PREFERRED EMBODIMENT

Figure 1:
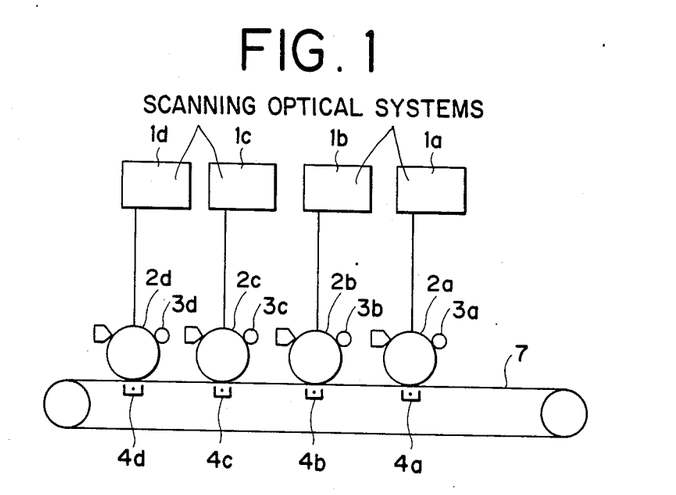
FIG. 1 shows a configuration of a color image recording apparatus to which the present invention is applied.

FIG. 1 shows a configuration of a color image recording apparatus to which the present invention is applied. The apparatus shown records a color image having half-tones. Color image information is supplied to an electronic copying apparatus (laser beam printer) having a plurality of parallelly arranged photosensitive drums to record the color image on one record paper with different colors being superimposed. The color image information is supplied from an image memory (not shown) to scanning optical systems $1a$–$1d$ to intensity-modulate laser beams, which are then focused on the parallelly arranged photosensitive drums $2a$–$2d$ corresponding to cyan (C), magenta (M), yellow (Y) and black (Bl). Developing units $3a$–$3d$ are arranged near the respective photosensitive drums $2a$–$2d$ and chargers $4a$–$4d$ are arranged to face the respective photosensitive drums $2a$–$2d$ inside of a conveyer belt 7. The intensity-modulated laser beams emitted from the scanning optical systems $1a$–$1d$ are focused on the respective photosensitive drums $2a$–$2d$ and the focused images are changed to electrostatic latent images by an electronic photographing process. The electrostatic latent images of the respective colors are developed by the developing units $3a$–$3d$ and the respective color images are sequentially transferred to the record paper carried on the conveyor belt 7 so that the color image is formed.

Figure 2:
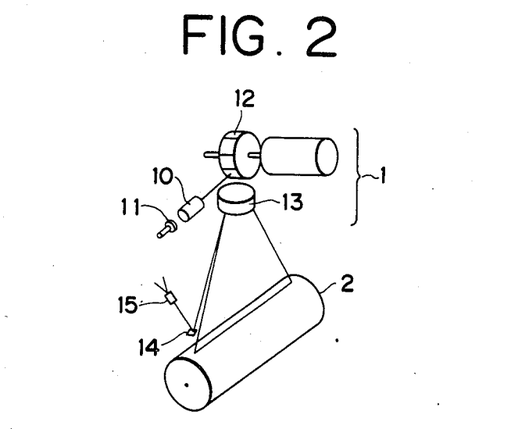
FIG. 2 shows a schematic perspective view of a scanning optical system.

A construction of the scanning optical system is shown in FIG. 2. It shows a schematic perspective view of one of the four scanning optical systems $1a$–$1d$ shown in FIG. 1. The intensity-modulated laser beam emitted from a semiconductor laser 11 is collimated by a collimating lens 10 and it is then deflected by a rotating polygon mirror 12 and focused on a photosensitive drum 2 through a focusing lens 13 to scan the beam in a direction of a main scan. In the beam scan, an end of one line of scan of the laser beam is reflected by a mirror 14 and directed to a photo-detector 15. A detection output signal from the photo-detector 15 is used as a synchronizing signal in the direction of the main scan.

Figure 3:
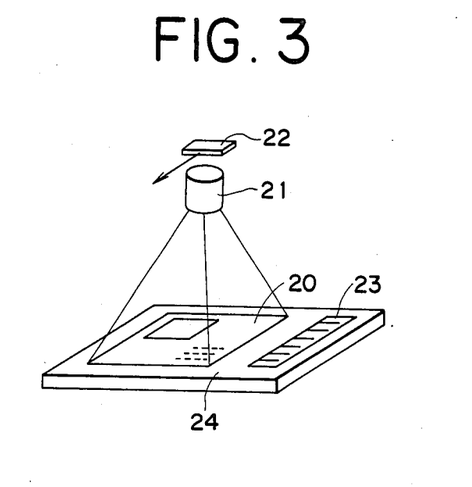
FIG. 3 shows a schematic perspective view of an image reading device.

A construction of an image reading device which supplies the image signal to the recording apparatus is shown in FIG. 3. A text 20 is mounted on a digitizer 24 and it is appropriately illuminated. An image of the text 20 is focused on a line sensor 22 through a focusing lens 21 arranged above the text 20.

Figure 4:
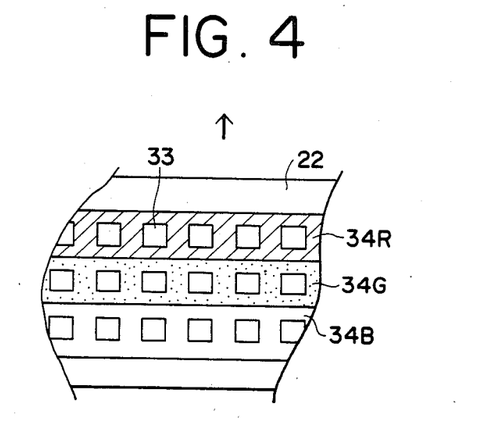
FIG. 4 shows a portion of a line sensor.

The line sensor 22 which may be a CCD sensor has, for example, three lines of 2048 CCD photosensing elements 33 with each of the lines being covered with a stripe color filter 34R, 34G or 34B of red (R), green (G) or blue (B), respectively.

By moving the line sensor 22 in a direction of an arrow shown in FIG. 3, the image of the text 20 can be scanned and read by the line sensor 22.

Figure 5:
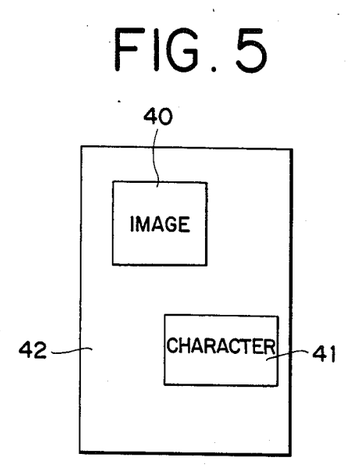
FIG. 5 shows a content of a text image.

It is assumed that the plane of the text 20 includes a color image zone 40, a black character zone 41 and other blank zone 42 as shown in FIG. 5, and the respective zones are represented by 2-bit binary numbers (zone codes) as follows.

Solid color zone : 11
Character zone : 01
Color image zone : 10
Blank zone : 00

The solid color zone means an entirely colored zone, and the character zone contains black characters in the present embodiment although other color characters may be used.

A memory unit having a sufficient capacity to store image information for respective fine areas corresponding to picture cells is provided for each of the four colors (C, M, Y, Bl). For example, when the entire area of the size A4 text 20 is divided into 1 mm square fine areas, approximately $200 \times 300 = 60,000$ fine areas are defined, and the 2-bit image information (zone code) is assigned to each of the fine areas. Thus, approximately 120K bits of data are produced for one size A4 text. They correspond to two 64K-bit memory units. Since those memory units are required one set for each of the four colors, the memory unit must have the capacity of $120K \times 4$ bits.

The size of the fine area may be appropriately determined in accordance with the memory capacity.

Figure 6:
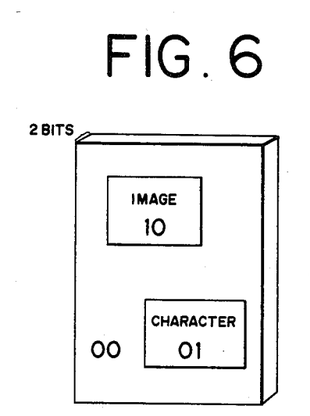
FIG. 6 shows a schematic view of a memory unit used in the color image processing apparatus.

In preparing the image information data to be stored in the memory unit, the type and color information of the image on the text 20 are specified by a display 23 on the digitizer 24 while an operator views the image of the text 20 mounted on the digitizer 24 of the image reading device of FIG. 3, and the 2-bit codes for the zones 40 and 41 are stored in the memory unit (zone memory) shown in FIG. 6. The zone memories of the respective colors are initially set to the blank zone "00", and the zones and the colors are designated by the digitizer 24 so that the respective zones are specified to the color image zone "10" or the character zone "01". Thus, the selected areas of the respective zone memories are written with the character zone code "01" or the image zone code "10". Further, the blank zone code "00" and the solid color zone code "11" are also designated for each color.

Figure 7:
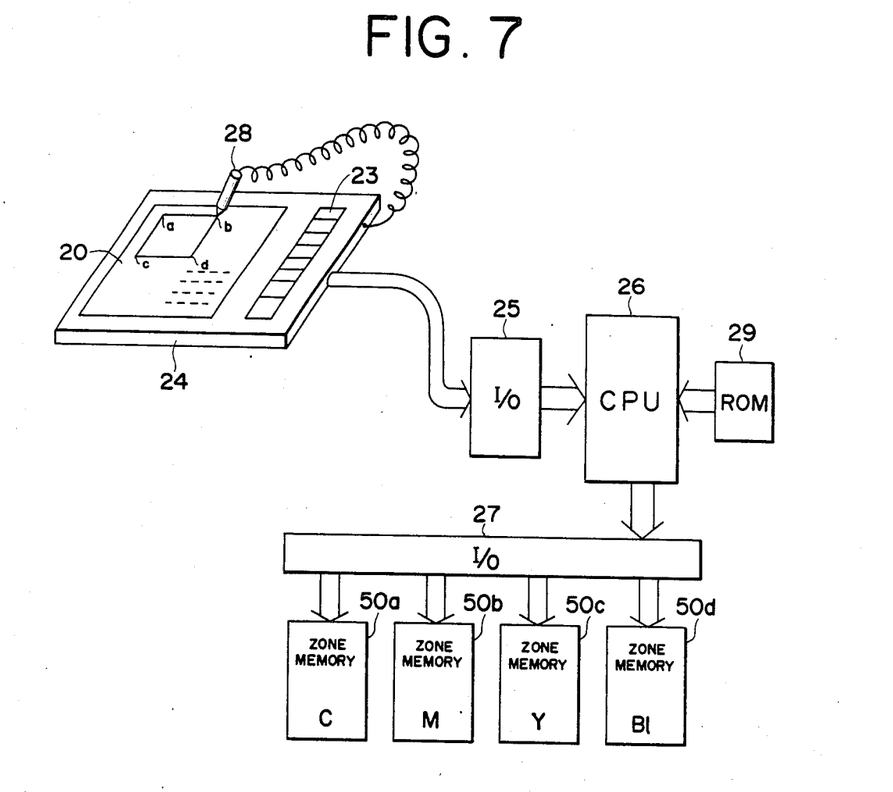
FIG. 7 shows a control block diagram for writing a zone code in a zone memory.

FIG. 7 shows a control block diagram for writing the zone code into the respective color zone memories 50a–50d. A pen 28 is used to specify a zone on the text 20, and a microcomputer (CPU) 26 writes the zone codes into the zone memories in accordance with the zone specified by the pen 28.

For example, if a color image zone (a, b, c, d) is specified by the pen, the microcomputer 26 writes the zone codes "10" in the zone of the zone memory corresponding to the image zone (a, b, c, d).

A display 23 indicates the type and the color of the image in the image zone specified by the pen 28. The microcomputer 26 selects the zone memory in accordance with the type and the color of the image indicated by the display 23 and writes the zone codes into the specified zone of the selected memory. For example, if the display 23 indicates that the image zone (a, b, c, d) is the color image zone, the microcomputer 26 writes the zone codes "10" into the zones of the zone memories 50a–50c corresponding to the image zone (a, b, c, d).

The zone memories 50a, 50b and 50c are the memory units for cyan (C), magenta (M) and yellow (Y), respectively, and the zone memory 50d is the memory unit for black (Bl). Numerals 25 and 27 denote interfaces (input-/output devices) for connecting the digitizer 24 and the CPU 26, and the CPU 26 and the zone memories 50a–50d, respectively.

Figure 8:
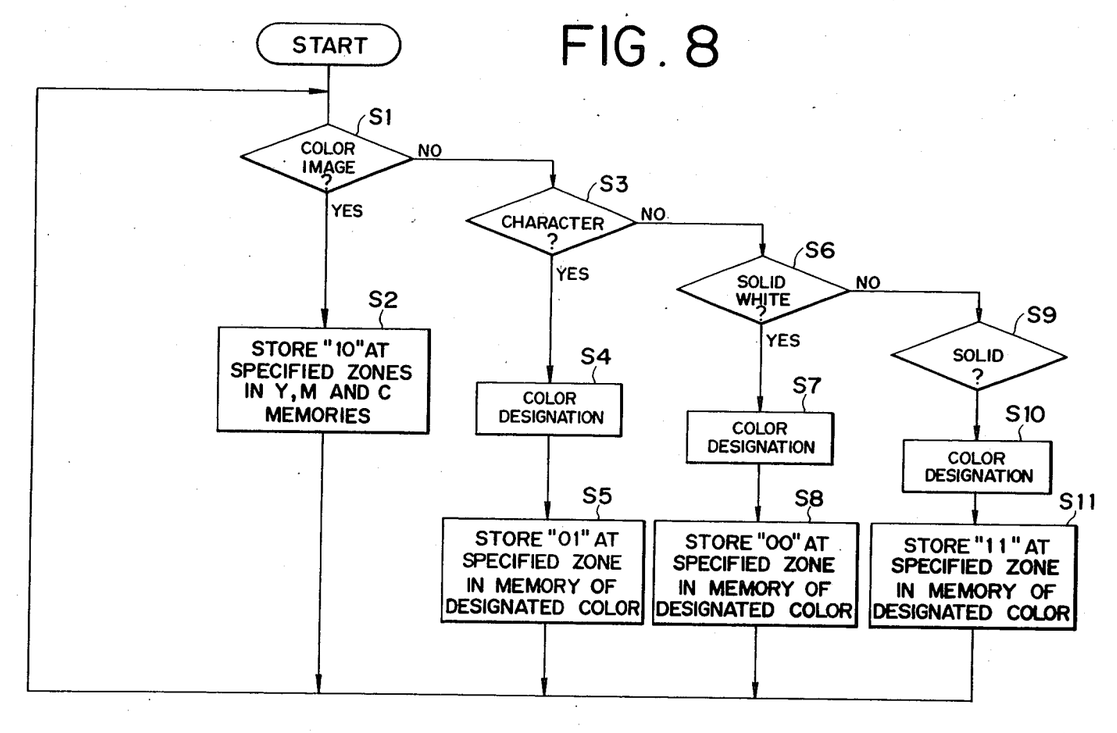
FIG. 8 shows a general flow chart for specifying a zone.

FIG. 8 shows a general flow chart of a program for specifying the zone in the zone memory, stored in a ROM 29. The CPU 26 writes the zone codes into the zone memories in accordance with this program. In the flow chart shown, in a step S1, an image signal to be processed (zone specified by the pen 28) is checked for the color image zone and if it is a color image zone, the color image zone codes "10" are written into the specified zones of the respective color zone memories in a step S2. If the image signal to be processed is not the image signal (specified zone), it is checked for the character zone in a step S3, and if it is the character zone, the color designation by the display 23 is checked in a step S4 and the character zone codes "01" are written into the specified zone of the zone memory of the designated color in a step S5. If the image signal (specified zone) is not the character zone, it is checked for the blank zone in a step S6, and if it is the blank zone, the color designation by the display 23 is checked in a step S7 and the blank zone codes "00" are written into the specified zones of the zone memories 50a–50d in a step S8. When the specified zone is the solid white (blank) zone, the color designation by the display 23 may not be checked.

If the specified zone is not the solid white (blank) zone but it is a solid color zone (step S9), the color designation by the display 23 is checked in a step S10 and the solid color zone codes "11" are written into the specified zone of the zone memory of the designated color in a step 11.

Figure 9:
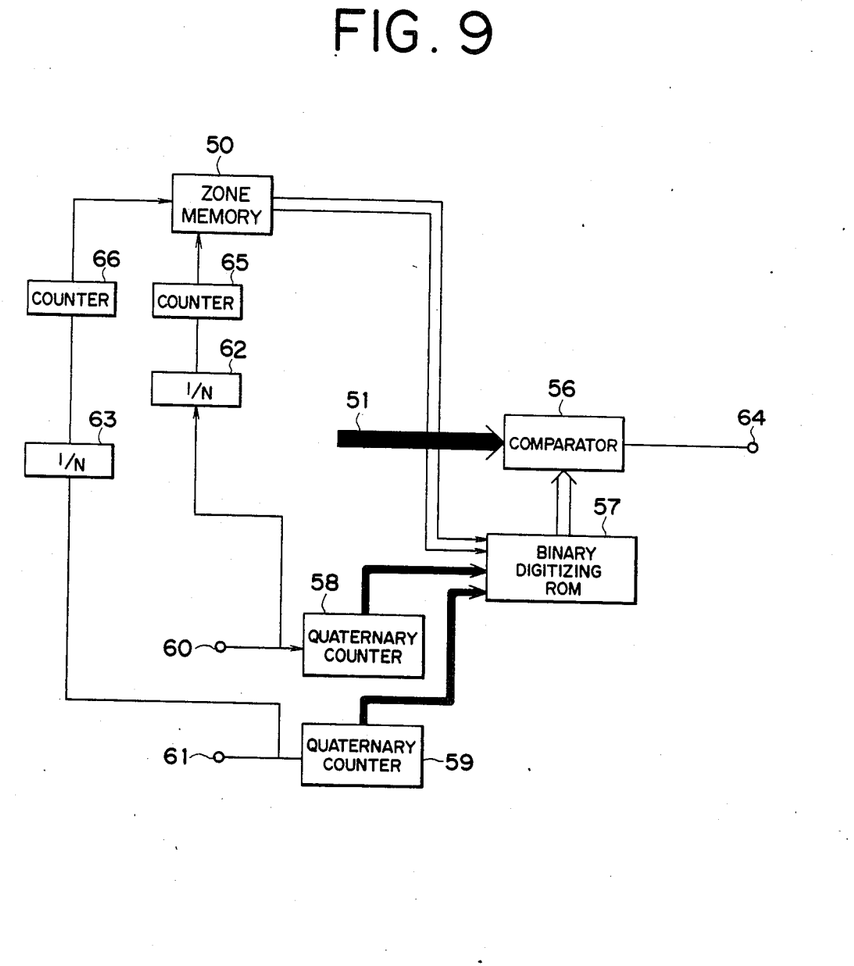
FIG. 9 shows a block diagram of a configuration of an image processing apparatus in accordance with one emboidment of the present invention.

FIG. 9 shows a configuration of an image signal processing system for processing the image data using the zone memories. 8-bit image data 51 is supplied to a comparator 56 in synchronism with a picture cell clock signal 60 and it is compared with a threshold pattern stored in a binary digitizing read-only memory 57 to produce a processed image signal 64. The processed image signal 64 comprises binary signals "1" and "0", which is used to modulate the laser beam emitted from the semiconductor laser 11. The binary digitizing read-only memory 57 is driven by address signals derived from quaternary counters 58 and 59 to which the picture cell clock signal 60 and a horizontal synchronizing signal 61 corresponding to the image data 51 are supplied, respectively. A threshold pattern suitable to the input image data 51 is read out of the read-only memory 57 by the zone code from the zone memory 50 and it is supplied to the comparator 56. The picture cell clock 60 and the horizontal synchronizing signal 61 are also supplied to 1/N frequency dividers 62 and 63, respectively, which produce signals to drive counters 65 and 66, respectively. The zone code is read from the zone memory 50 by the horizontal and vertical address signals produced by the counters 65 and 66, respectively.

Figure 10:
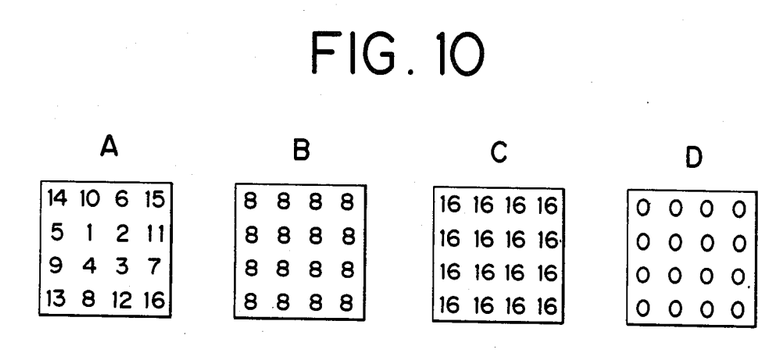
FIGS. 10A–10D show threshold patterns used in the image processing apparatus.

The zone code read from the zone memory 50 is supplied to the binary digitizing read-only memory 57 as a two-bit high order address to read out the threshold pattern. Examples of the threshold pattern are shown in FIGS. 10A–10D. FIG. 10A shows a dither pattern as a color image threshold pattern, and FIGS. 10B, 10C and 10D show fixed level threshold patterns for the character zone, the solid white (blank) zone and the solid color zone, respectively. Only when the image data exceeds the threshold level of the threshold pattern, the output image signal 64 is logical "1" or black. The binary digitizing read-only memory 57 is constructed as follows.

Addresses 00-0F: digitizer pattern of FIG. 10A
Addresses 10-1F: character fixed pattern of FIG. 10B
Addresses 20-2F: solid white zone fixed pattern of FIG. 10C
Addresses 30-3F: solid color zone fixed pattern of FIG. 10D The address signal for the binary digitizing read-only memory 57 comprises the two-bit zone code from the zone memory 50, the two-bit signal from the quaternary counter 58 and the two-bit signal from the quaternary counter 59. Accordingly, the threshold pattern is selected by the two-bit zone code from the zone memory 50.

Figure 11:
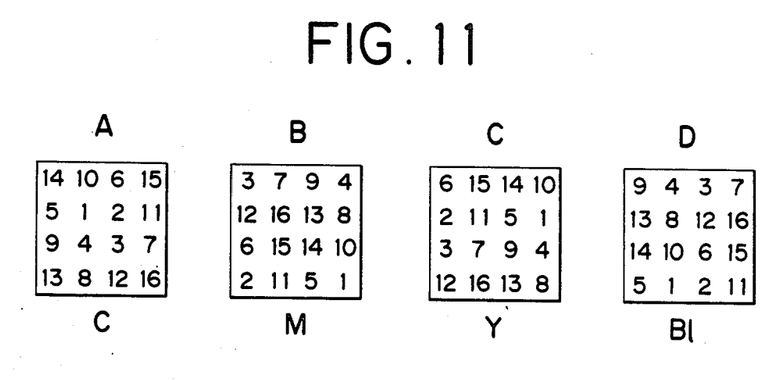
FIGS. 11A–11D show threshold patterns for respective colors.

The image signal processing system shown in FIG. 9 is only for one color, and in practice, four of the image signal processing systems of FIG. 9 are provided, one for each of the colors C, M, Y and Bl. The color image threshold patterns stored in the respective ROM's 57 differ depending on the color as shown in FIGS. 11A-11D. For cyan (C), a dither pattern as shown in FIG. 11A is stored, and for magenta (M) and yellow (Y), dither patterns as shown in FIGS. 11B and 11C, respectively, are stored in the ROM 57. A dither pattern shown in FIG. 11D is a monochromatic dither pattern which is used when the half-tone image data to be compared is monochromatic.

In the present embodiment, since the threshold patterns of different arrays as shown in FIGS. 11A-11C are used for the different colors, the reproducibility for a high intensity tone area is improved because the threshold levels of the threshold patterns of FIGS. 11A-11C do not coincide with each other at the high intensity input image area.

As described hereinabove, in accordance with the present embodiment, the image data 51 read by the line sensor 22 is compared with the optimum threshold pattern in accordance with the type and the color of the text so that it is optimumly digitized, and the digitized binary signal is supplied to the laser beam printer as shown in FIG. 1 to record the image or the characters, or it may be temporarily stored in a memory.

In the present embodiment, there is employed a dither method in which each picture cell is compared with one element of the threshold pattern to produce the binary output. However, the present invention is not limited thereto but each input picture cell may be compared with all elements of the threshold pattern to produce a binary output (density pattern method) or each input picture cell may be compared with a plurality of elements of the threshold pattern.

As is apparent from the above description, the present invention can record the color image, the characters and the line image with a high quality. By attaching the code signal representing the content of the image zone of the image signal to the image signal and digitizing the image signal by the comparison with the threshold pattern suitable to the content of the image zone, the color image, the characters and the line image can be properly recorded with the small capacity memory. Further, a portion of the color image on the text can be reproduced with a high tonality. Furthermore, a portion of the image on the text can be masked by a desired color.

In the present embodiment, the zone codes are written into the zone memories corresponding to the text image and the threshold pattern is selected in accordance with the zone code. Accordingly, the half-tone image and the line image can be sharply reproduced.

Further, in the present embodiment, if a color image zone on the text image is circular, the zone codes "10" need only be written into a circular zone of the zone memory. Thus, the threshold pattern can be finely selected with a simple construction and a high quality of image can be reproduced. In the present embodiment, if the input image data is half-tone color image data, the color image threshold pattern is selected by the zone code and the color of the threshold pattern is selected depending on the designated color. Accordingly, an excellent color image is reproduced.

The present invention is not limited to the embodiment described above but various modifications can be made within the scope of the appended claims.

What is claimed is:

1. Color image processing apparatus comprising:
   color image signal generating means for generating a color image signal relating to an image comprising zones which may have different color image types;
   address signal generating means for generating an address signal representing a zone on the image;
   code signal generating means for generating a code signal representing a color image type for each zone of the image, having a different color image type, in accordance with the address signal; and
   color image signal processing means for processing the color image signal in a plurality of process modes, said processing means selecting one of said plurality of process modes in accordance with the code signal generated by said code signal generating means.

2. Apparatus according to claim 1, wherein said color image signal processing means utilizes a plurality of threshold patterns to dither-process the color image signal, one of the threshold patterns being selected in accordance with the code signal.

3. Apparatus according to claim 2, wherein said color image signal processing means selects a threshold pattern in accordance with the color represented by the color image signal and the code signal.

4. Apparatus according to claim 1, further comprising memory means for storing the code signal corresponding to an address on the image.

5. Apparatus according to claim 4, wherein said memory means is provided for each color represented by the color image signal.

6. Apparatus according to claim 1, wherein one of the color image types is a character.

7. Apparatus according to claim 1, wherein one of the color image types is a half-tone color image.

8. Apparatus according to claim 1, wherein one of the color image types is a solid color image.

9. Apparatus according to claim 1, wherein one of the color image types is a space.

10. Color image processing apparatus comprising:
    color image signal generating means for generating a color image signal relating to an image comprising zones which may have different color image types;
    memory means for storing a code signal representing a color image type, for each zone of the image having a different color image type and corresponding to an address on the image;

address signal generating means for generating an address signal representing an address on the image; and color image signal processing means for processing the color image signal in a plurality of modes, said processing means reading a code signal from said memory means in accordance with the address signal generated by said address signal generating means and selecting one of said plurality of process modes in accordance with the code signal read from said memory means.

11. Apparatus according to claim 10, wherein said color image signal processing means utilizes a plurality of threshold patterns to dither-process the color image signal, one of the threshold patterns being selected in accordance with the code signal.

12. Apparatus according to claim 11, wherein said color image signal processing means selects a threshold pattern in accordance with the color represented by the color image signal and the code signal.

13. Apparatus according to claim 10, wherein one of the color image types is a character.

14. Apparatus according to claim 10, wherein one of the color image types is a half-tone color image.

15. Apparatus according to claim 10, wherein one of the color image types is a solid color image.

16. Apparatus according to claim 11, wherein one of said color image types is a space.

17. Apparatus according to claim 1, further comprising first designating means for manually designating each zone of the image and second designating means for manually designating a color image type for each zone of the image.

18. Apparatus according to claim 10, further comprising first designating means for manually designating each zone of the image and second designating means for manually designating a color image type for each zone of the image.

* * * * *

UNITED STATES PATENT AND TRADEMARK OFFICE
CERTIFICATE OF CORRECTION

PATENT NO. : 4,674,861

DATED : June 23, 1987

INVENTOR(S) : NAOTO KAWAMURA

It is certified that error appears in the above-identified patent and that said Letters Patent is hereby corrected as shown below:

COLUMN 1

Line 13, "half-tone" should read --halftone--,
Line 18, "half-tones" should read --halftones--.
Line 35, "half-tones" should read --halftones--.
Line 38, "half-tones" should read --halftones--.
Line 45, "half-tones" should read --halftones--.
Line 57, "other" should read --another--.

COLUMN 2

Line 13, "emboidment" should read --embodiment--.
Line 24, "half-tones" should read --halftones--.

COLUMN 3

Line 29, After "Since" insert --one set of--.
Line 30, Delete "one set".

UNITED STATES PATENT AND TRADEMARK OFFICE
CERTIFICATE OF CORRECTION

PATENT NO.   :   4,674,861                                  Page 2 of 2

DATED        :   June 23, 1987

INVENTOR(S)  :   NAOTO KAWAMURA

It is certified that error appears in the above-identified patent and that said Letters Patent is hereby corrected as shown below:

COLUMN 5

Line 32, "half-tone" should read --halftone--.

COLUMN 6

Line 6, "half-tone" should read --halftone--.
    Line 14, "half-tone" should read --halftone--.
    Line 58, "half-tone" should read --halftone--.

COLUMN 8

Line 6, "half-tone" should read --halftone--.

Signed and Sealed this

Twenty-fourth Day of November, 1987

Attest:

DONALD J. QUIGG

*Attesting Officer*       *Commissioner of Patents and Trademarks*